United States Patent [19]
Haunhorst et al.

[11] Patent Number: 5,123,446
[45] Date of Patent: Jun. 23, 1992

[54] DUAL SEAL COUPLING

[75] Inventors: Gregory A. Haunhorst, Van Wert; Phillip G. Fuerst, Kalida, both of Ohio

[73] Assignee: Aeroquip Corporation

[21] Appl. No.: 726,031

[22] Filed: Jul. 5, 1991

[51] Int. Cl.⁵ .............................................. F16L 37/28
[52] U.S. Cl. ................. 137/614.02; 137/614; 137/614.03
[58] Field of Search .............. 137/614.03, 614.04, 137/614, 614.02; 251/149.8

[56] References Cited

U.S. PATENT DOCUMENTS

| | | | |
|---|---|---|---|
| 3,039,794 | 6/1962 | DeCenzo | 137/614.03 |
| 4,219,048 | 8/1980 | Ekman | 137/614.04 |
| 4,240,466 | 12/1980 | Herzan et al. | 137/614.04 |
| 4,327,770 | 5/1982 | Brown et al. | 251/149.8 |
| 4,982,761 | 1/1991 | Kreczko et al. | 137/614.03 |

FOREIGN PATENT DOCUMENTS 1425520 1/1970 Fed. Rep. of Germany ... 251/149.8

Primary Examiner—A. Michael Chambers

[57] ABSTRACT

A sealing system for high pressure fluid couplings wherein male and female valved coupling parts are interconnected while under fluid pressure, the sealing system including a pair of diverse characteristic seal rings axially spaced in the direction of relative coupling part movement. The seal ring closest to the pressurized medium is semi-rigid to prevent blow-out from its recess during coupling disconnection and interconnection while the second seal ring is of greater elasticity and sealability to prevent leakage. The axial spacing between the seal rings permits adequate internal support for the second seal prior to the opening of the coupling parts' valves.

15 Claims, 7 Drawing Sheets

DUAL SEAL COUPLING

BACKGROUND OF THE INVENTION

1. Field of the Invention

The invention pertains to sealing systems for two part fluid handling couplings, particularly couplings wherein one or more of the parts may be under pressure during connection or disconnection. Couplings of this type are often used with hydraulically powered tools wherein different tools may be selectively attached to a common flexible pressurized medium supply hose.

2. Description of the Related Art

Tools and other devices powered by pressurized hydraulic fluid, or compressed air, normally utilize quick connect and disconnect fittings whereby the tools may be quickly attached to a pressurized supply line, or detached therefrom. It is highly desirable that different types and brands of tools be connectable to standard couplings, and the Hydraulic Tool Manufacturers Association (HTMA) has determined standards for couplings for use with its members' products.

Fluid couplings as used with hydraulic tools may be subjected to fluid pressures of 1800 psi or more and as the coupling parts usually incorporate self-sealing valves to prevent the loss of fluid when the coupling parts are disconnected it is not unusual for at least one of the coupling parts to be under pressure when interconnection of the coupling parts is desired. Pressurizing of a fluid circuit may occur because of weight imposed upon an expansible chamber motor within the circuit, or thermal pressurization, or even hose winding or storage may pressurize a hydraulic fluid circuit which would normally be depressurized.

To produce a leak-proof connection between coupling parts, it has been the practice to utilize a conventional O-ring seal located within a recess defined within the passage of the male coupling part which engages a valve sleeve in the female part when full interconnection is achieved. While such conventional use of an O-ring seal is capable of rendering the coupling fluid tight, the disconnection or connection of coupling parts while one or both parts are under pressure causes a short exposure of the O-ring seal to the coupling pressure when the seal is not internally supported which often results in the seal ring being blown from its recess destroying the sealing ability of the coupling. Also, couplings utilizing only conventional O-ring seals often experience the extrusion of the O-ring from its recess into the space between the parts when directly subjected to high pressures, or into the valve seat of the female part, if any misalignment exists during coupling or uncoupling.

To minimize seal ring blow-out and extrusion it has been proposed to employ a stiff and semi-rigid seal ring, rather than a conventional O-ring, in conjunction with the male coupling part recess. By using a semi-rigid seal ring significantly greater resistance to seal blow-out is achieved. One type of semi-rigid seal ring which may be employed in the environment discussed above is disclosed in the assignee's U.S. Pat. No. 4,614,348 wherein a two part seal ring is disclosed having a body of relatively stiff semi-rigid material used in conjunction with a conventional O-ring to prevent fluid bypassing the stiffer seal material.

While the use of a stiff and semi-rigid seal ring does prevent seal ring blow-out during connection and disconnection of the coupling parts, the stiffer and semi-rigid characteristic of the seal ring makes it difficult to acheive effective sealing and this type of seal ring will often permit leakage or seepage. Such leakage may occur because the surface finish engaged by the semi-rigid seal ring is too rough to provide 100% resistance to leakage.

Further, as the valve parts are subjected to numerous connections and disconnections the sealing surfaces of the seal ring may become scratched, particularly in dirty and gritty environments. Also, seals which are formed of stiff and semi-rigid material do not accommodate themselves to manufacturing tolerances as well as softer and more elastic seal rings, and when using a semi-rigid seal ring the presence of maximum tolerances with one coupling part may cause the seal ring to set at such maximum diameter and use of the coupling part containing the seal ring with another female part of a lesser dimension, still within tolerances, may produce spacing which will permit leakage.

OBJECTS OF THE INVENTION

It is an object of the invention to provide a seal system for interconnectable and disconnectable fluid coupling parts wherein the parts may be interconnected and disconnected while under pressure and dual seals are used intermediate the parts wherein the seals' characteristics augment each other and seal blow-out is prevented while high efficiency sealing is accomplished.

Another object of the invention is to provide a dual seal system for interconnectable fluid couplings wherein one of the seals is of a stiff semi-rigid construction capable of resisting seal blow-out, and the other of the seals is protected against exposure to the high forces present during connection or interconnection by the first seal, and the greater flexibility and elasticity of the second seal achieves superior sealability.

A further object of the invention is to provide a dual seal system for two part fluid couplings wherein a stiff and less resilient seal is used to buffer and protect a more flexible and elastic seal from blow-out and extrusion.

Yet another object of the invention is to provide a dual seal system for interconnectable fluid couplings which may be utilized with fluid couplings constructed in accord with HTMA standards and does not require overall coupling dimensional changes.

An additional object of the invention is to provide a dual seal system for interconnectable coupling parts wherein the seal system includes axially spaced recesses separated from each other in the direction of coupling movement by sufficient distance to permit the stiffer and most rigid of the seal rings to protect the more flexible and elastic of the seal rings from coupling pressures, and the more elastic seal ring is internally supported by coupling structure prior to being exposed to the pressurized medium.

SUMMARY OF THE INVENTION

The invention pertains to a dual seal system for interconnectable male and female coupling parts. The type of fluid coupling with which the invention is particularly advantageous is that standardized by the HTMA, an example being the coupling that is sold by the assignee, Aeroquip Corporation of Jackson, MI, identified as the Series FD49. Such couplings are widely used with power tools selectively interconnected to a hose supplying a pressurized hydraulic or air medium. Pressures as high as 1000 psi may be encountered when using couplings for hydraulically operated tools, and in the practice of the invention seal blow-out is eliminated even though coupling interconnection or disconnection may occur under high pressures.

Couplings incorporating the inventive concepts include male and female parts capable of being separated and selectively latched in an interconnected relationship. Each of the parts includes a self-sealing valve.

The male coupling part includes a poppet valve which is spring biased toward its closed condition wherein the poppet valve is received within a cylindrical sealing surface adjacent the part outer end. As later described, dual seals are mounted within the male coupling part and sealingly engage the poppet valve when located within the sealing surface. Exteriorly, the male part includes an annular groove for receiving locking detents defined upon the female part.

The female coupling part includes a fixed valve stem having a head aligned with the outer end of the female part. An annular valve seat is defined on the head and a valve sleeve is biased into engagement with the valve seat to selectively close the female part passage. An annular detent sleeve circumscribes the outer surface of the valve sleeve and is engageable by the end of the male part during interconnection. Axial displacement of the detent sleeve inwardly a predetermined extent abuts the detent sleeve against a shoulder on the valve sleeve to unseat the valve sleeve from the valve head. An axially biased locking sleeve mounted upon the female coupling part selectively operates ball detents for forcing the detents into the male part groove once the coupling parts are fully connected.

As the coupling parts are interconnected the poppet valve and valve head engage whereby relative axial movement of the coupling parts toward each other removes the poppet valve from association with its seals. As the nose of the male coupling part passes over the exterior sealing surface of the valve sleeve the outermost seal ring located on the male part is received upon the valve sleeve and is inwardly supported thereby. During connection, or disconnection, the axial spacing between the seal rings defined on the male coupling part is such that the seal ring furthest from the male part outer end will be in a sealed relationship with the poppet valve while the seal ring closest to the male part outer end is located on the valve sleeve, and at this time the valves of both coupling parts are closed and no fluid is flowing through the coupling and the seals are not exposed to surges of pressurized medium.

When the coupling parts are fully connected both seal rings will be located on the exterior sealing surface of the valve sleeve and internally supported, and under such conditions seal blow-out cannot occur.

To achieve the desired results of the inventive concept the physical characteristics of the two seal rings mounted upon the male coupling part are different. Each of the seal rings is located within an annular recess defined in the male coupling part intersecting and concentric to the cylindrical surface receiving the poppet valve. The seal ring located in the recess furthest from the outer end of the male coupling part is of a stiff semi-rigid material, such as polytetrafluoroethylene, and is of such rigidity, and dimension, relative to its associated recess, that seal blow-out is prevented. Preferably, the semi-rigid seal is associated with a more elastic O-ring seal to improve the sealing characteristics with respect to the associated recess, and this seal may be of the type shown in the assignee's U.S. Pat. No. 4,614,348.

The second seal of the dual sealing system of the invention is located in a recess located intermediate the semi-rigid seal and the outer end of the male coupling member. A conventional O-ring seal formed of rubber, nitryl, or the like, is located within this recess, and is of such dimension and elasticity as to provide excellent sealability with respect to the female coupling part.

The semi-rigid seal is located closer to the internal passage of the male coupling member containing high pressure medium than is the conventional O-ring seal, and the semi-rigid seal serves as a buffer to protect the O-ring seal against exposure to the high pressure surges that may occur as the coupling parts are connected or disconnected. As the semi-rigid seal significantly reduces the pressure and volume of medium imposed upon the O-ring seal the likelihood of the O-ring seal being blown or extruded from its recess is removed as not enough volume of fluid is exposed to the O-ring seal to flush the O-ring seal from its recess, and further, as the O-ring seal is internally supported by the valve sleeve whenever the coupling part valves are open the likelihood of inadvertent O-ring seal loss is substantially eliminated. Further, as the O-ring seal establishes an effective sealing relationship between the coupling parts prior to the valves thereof being opened, leakage during connection and disconnection is prevented.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
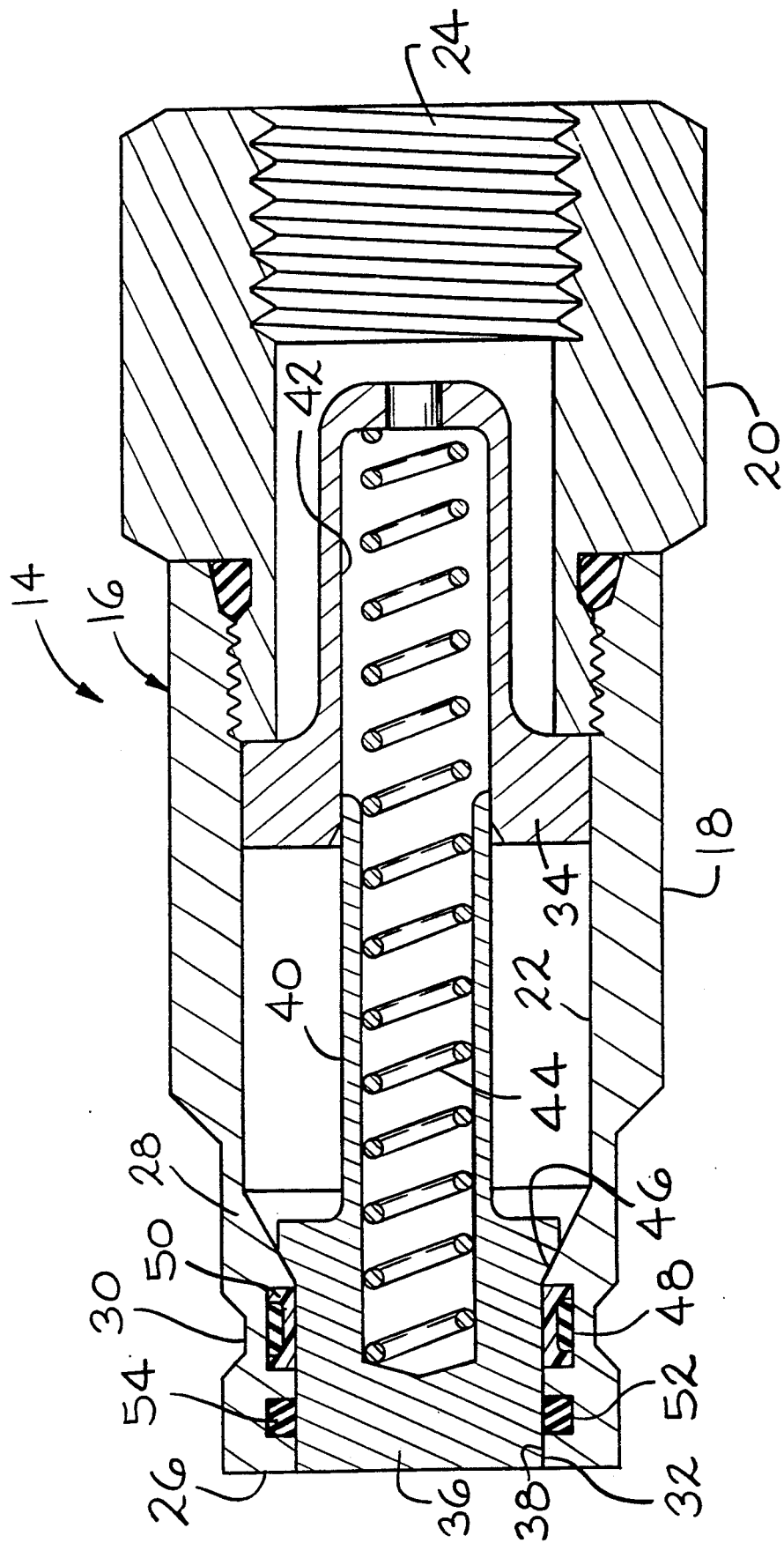
FIG. 1 is a diametrical, elevational, sectional view of a male coupling part in accord with the invention, the poppet valve being shown in the closed position.

In the drawings a typical coupling 10 is illustrated utilizing the dual seal concept of the invention. It is to be appreciated that the dual seal concept may be employed with a variety of coupling configurations wherein the seal "blow-out" problem exists, and the disclosed relationship of coupling components is illustrative of the environment with which the invention is used, and this general type of coupling is that which is approved by the HTMA.

The coupling 10 includes an interconnectable female part 12 and a male part 14, and with reference to FIG. 1 the particular construction of the part 14 will be appreciated.

The part 14 includes a body 16 formed by the tube 18 and adapter 20 which are threadably interconnected. The body 16 includes the axially extending passage 22 which communicates with the adapter threads 24 and the threads 24 permit a hose connection, or the like, not shown, to be attached to the adapter 20 for supplying pressurized hydraulic fluid, or other compressed medium, to the part 14.

The body outer end 26 is intersected by the passage 22 and a reduced cylindrical diameter nose 28 is defined on the part 14 adjacent the end 26. The annular groove 30 defined in the nose receives the detents of the female part as later described to permit interconnection of the coupling parts.

The cylindrical passage surface 32 adjacent the outer end 26 constitutes a sealing surface for the poppet valve as later described.

A spider 34 is centrally located within the passage 22 having passages defined therein whereby fluid may flow through the spider. The poppet valve 36 is supported within the spider 34, and the poppet valve includes an outer cylindrical surface 38 which is closely slidably received within the sealing surface 32. The poppet valve includes the elongated stem 40 which is received within the spider bore 42 and in this manner the poppet valve 36 is capable of being axially displaced within the passage 22 for movement between open and closed conditions, the closed position of the poppet valve being shown in FIG. 1. The spring 44 biases the poppet valve 36 into the sealing surface 32 and axial movement of the poppet valve is limited by engagement of the enlarged oblique shoulder surface 46 with the complementary shaped passage surface as apparent from FIG. 1.

The dual seal system constituting the crux of the invention is mounted within the nose 28 of the part 14, and the sealing system includes the annular recess 48 having the annular seal ring 50 located therein, and the seal ring receiving recess 52 also located within the nose 28 axially spaced from the recess 48 as to be separate and distinct therefrom which is located between the recess 48 and the outer end 26. The recess 52 includes the O-ring type seal 54. The seals 50 and 54 are described in detail below. The recesses 48 and 52 are concentric to and intersect the sealing surface 32.

Figure 2:
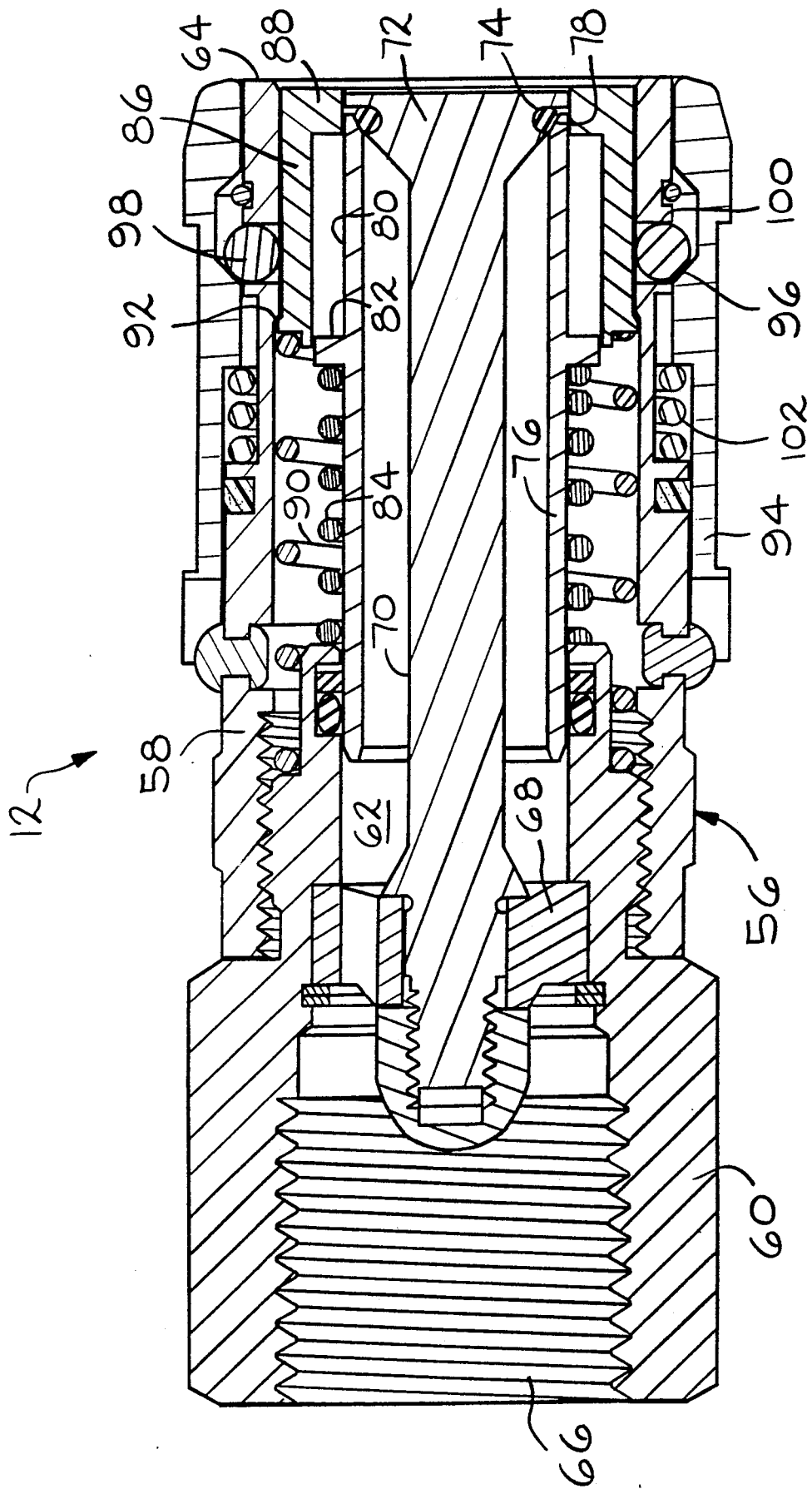
FIG. 2 is an elevational, diametrical, sectional view of a female coupling part in accord with the invention, the valve sleeve being closed.

The female coupling part 12 includes a body 56, FIG. 2, which is formed by the tube 58 and the adapter 60 which are threadably interconnected to form the body assembly. The body includes the axially extending passage 62 which intersects the body outer end 64 and communicates with the adapter threads 66. The threads 66 permit the part 12 to be threadably connected to a tool fitting or conduit, not shown, for establishing communication with the circuit thereof.

A spider 68 is located within the passage 62 and is provided with openings whereby the fluid may flow therethrough as passing through passage 62. The spider 68 supports the valve stem 70 which terminates at the valve head 72 located adjacent the body outer end 64. The valve head 72 includes the resilient O-ring valve seat 74.

The tubular valve sleeve 76 is reciprocally mounted within the passage 62 and includes an outer end 78 adapted to engage the valve seat 74 when the valve sleeve is in the closed position shown in FIG. 2. The valve sleeve 76 includes an outer cylindrical sealing surface 80, and a radially extending abutment shoulder 82 extends from the surface 80. A compression spring 84 interposed between the adapter 60 and the shoulder 82 biases the valve sleeve 76 toward the right, FIG. 2, to engage the sleeve end 78 with the valve seat 74.

An annular detent sleeve 86 holds the detents retracted and surrounds the valve sleeve sealing surface 80 and includes a radially extending outer head 88. The detent sleeve fills in the annular spacing between the valve sleeve 76 and the tube 58 and also functions as lost-motion means for operating the valve sleeve 76 as later described. A compression spring 90 biases the detent sleeve 86 toward the right, FIG. 2, and such movement is limited by engagement of the valve sleeve stop shoulder 92 with a similarly shaped shoulder formed on the tube 58.

Figure 4:
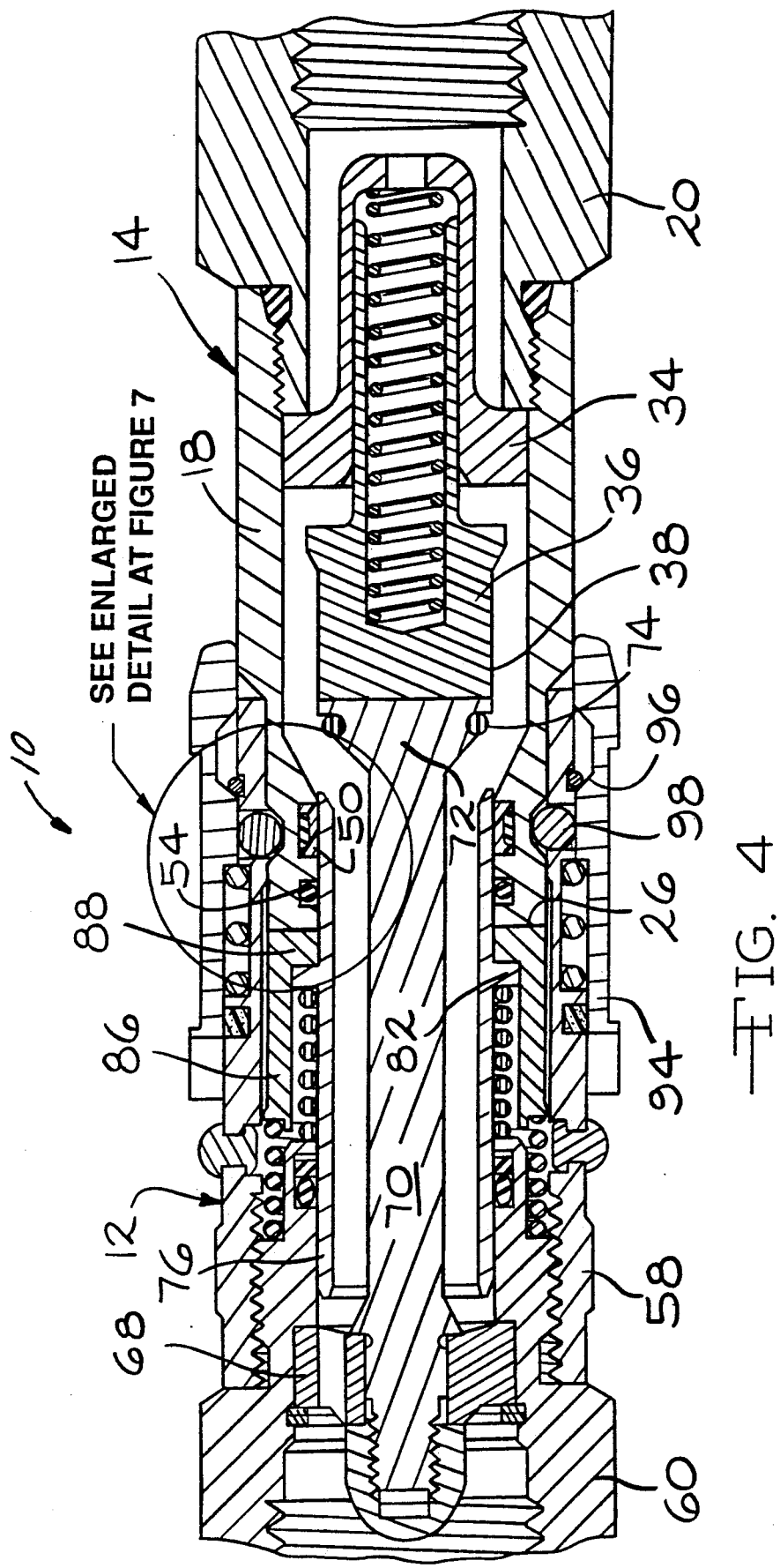
FIG. 4 is an elevational, sectional, diametrical view of the coupling parts as fully interconnected and latched together, with the valves in the fully open position.
Figure 5:
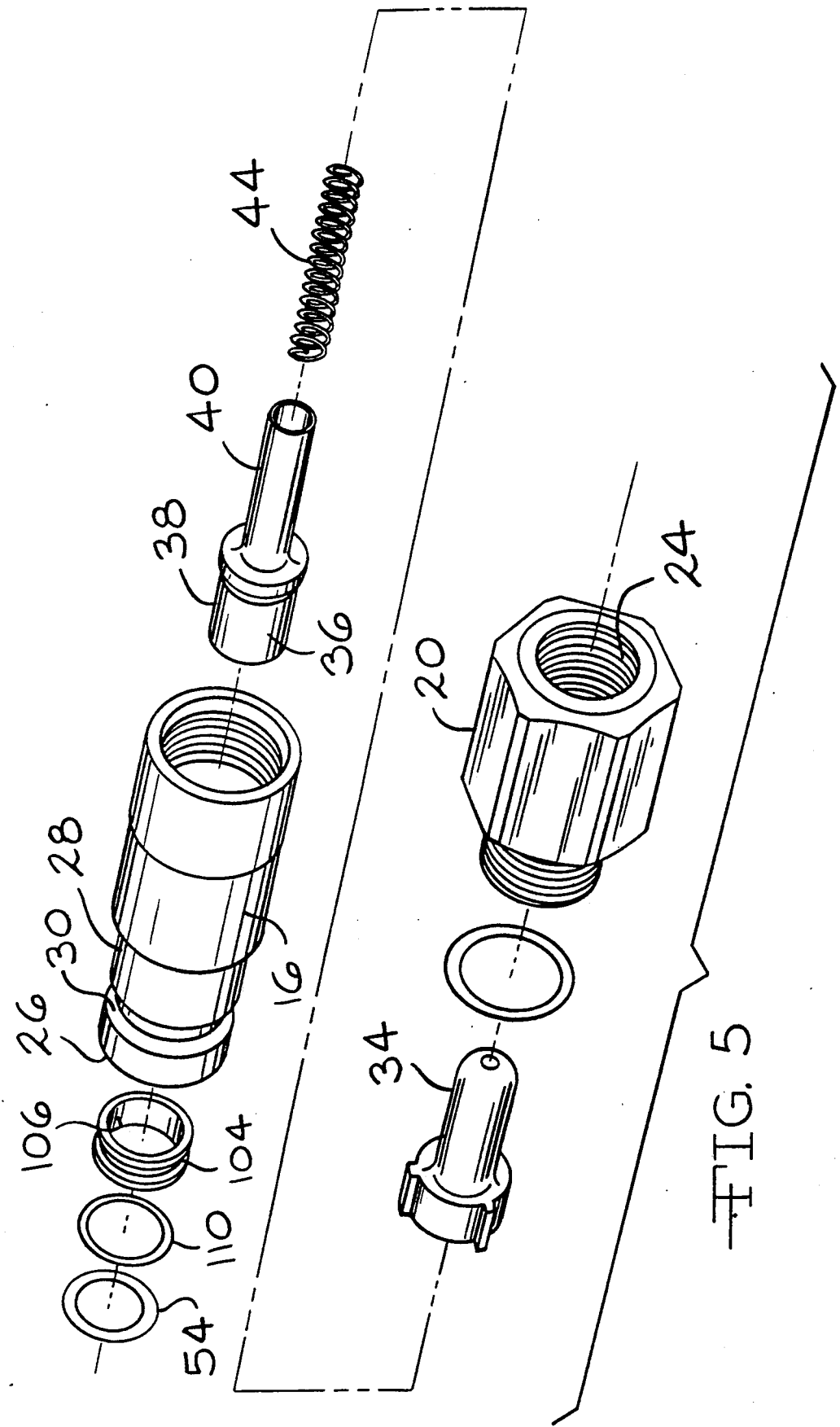
FIG. 5 is a perspective exploded view of the male coupling part.
Figure 6:
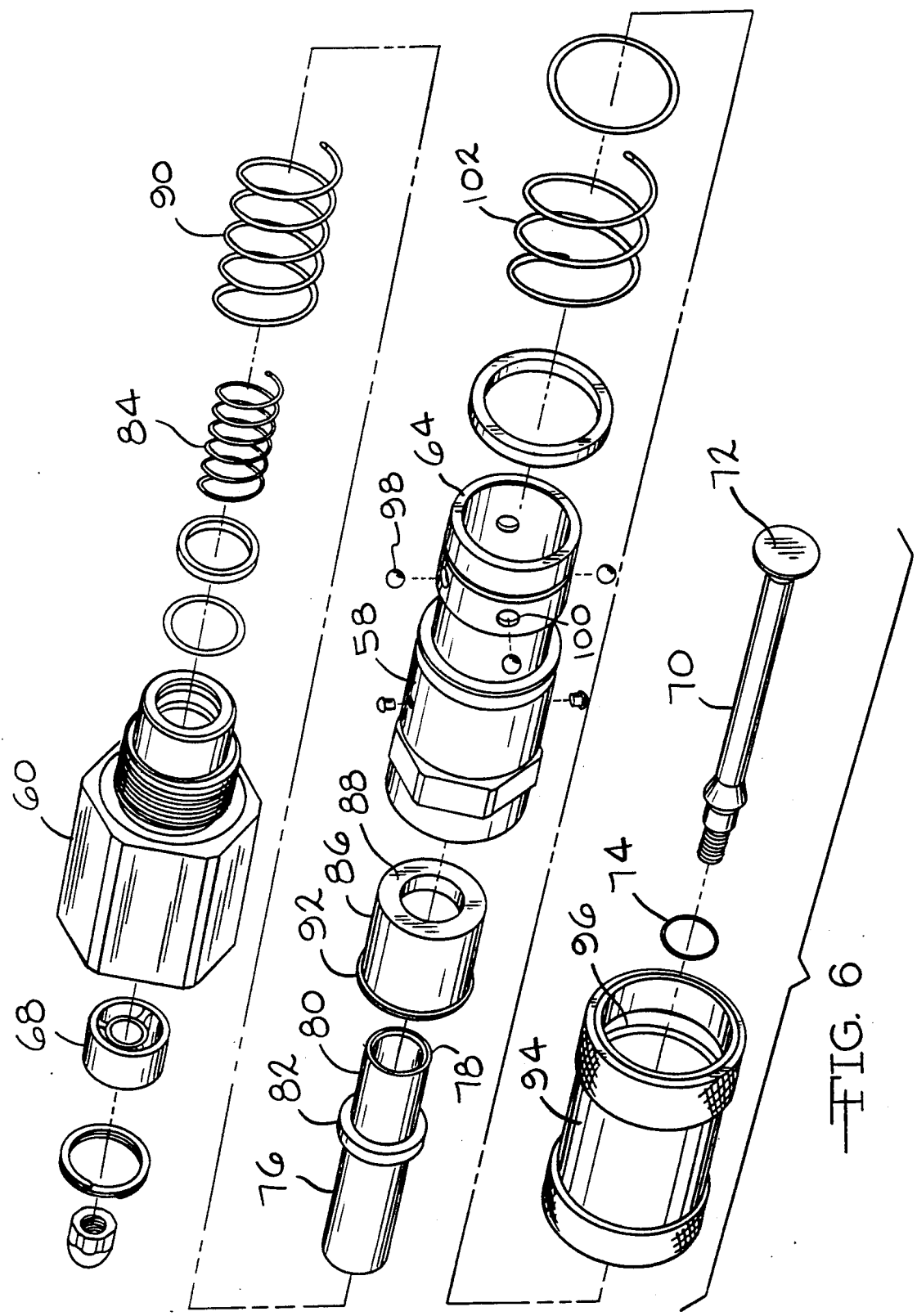
FIG. 6 is a perspective exploded view of the female coupling part.

Latching of the parts 12 and 14 together is accomplished by the annular lock collar 94 reciprocally mounted upon the tube 58 which operates in the known manner. The lock collar 94 includes an internal groove defining a cam surface 96 whereby detent balls 98 located within tube holes 100 will be biased inwardly into engagement with detent sleeve 86 due to the biasing force of the compression spring 102 endeavoring to move the lock collar 94 to the right, FIG. 2. As will be appreciated from FIG. 4, when the groove 30 of part 14 is aligned with the detent balls 98 the detent balls are received within the groove 30 and the lock collar will move to its extreme right position as shown in FIG. 4 to maintain the parts interconnected in the known manner.

Figure 7:
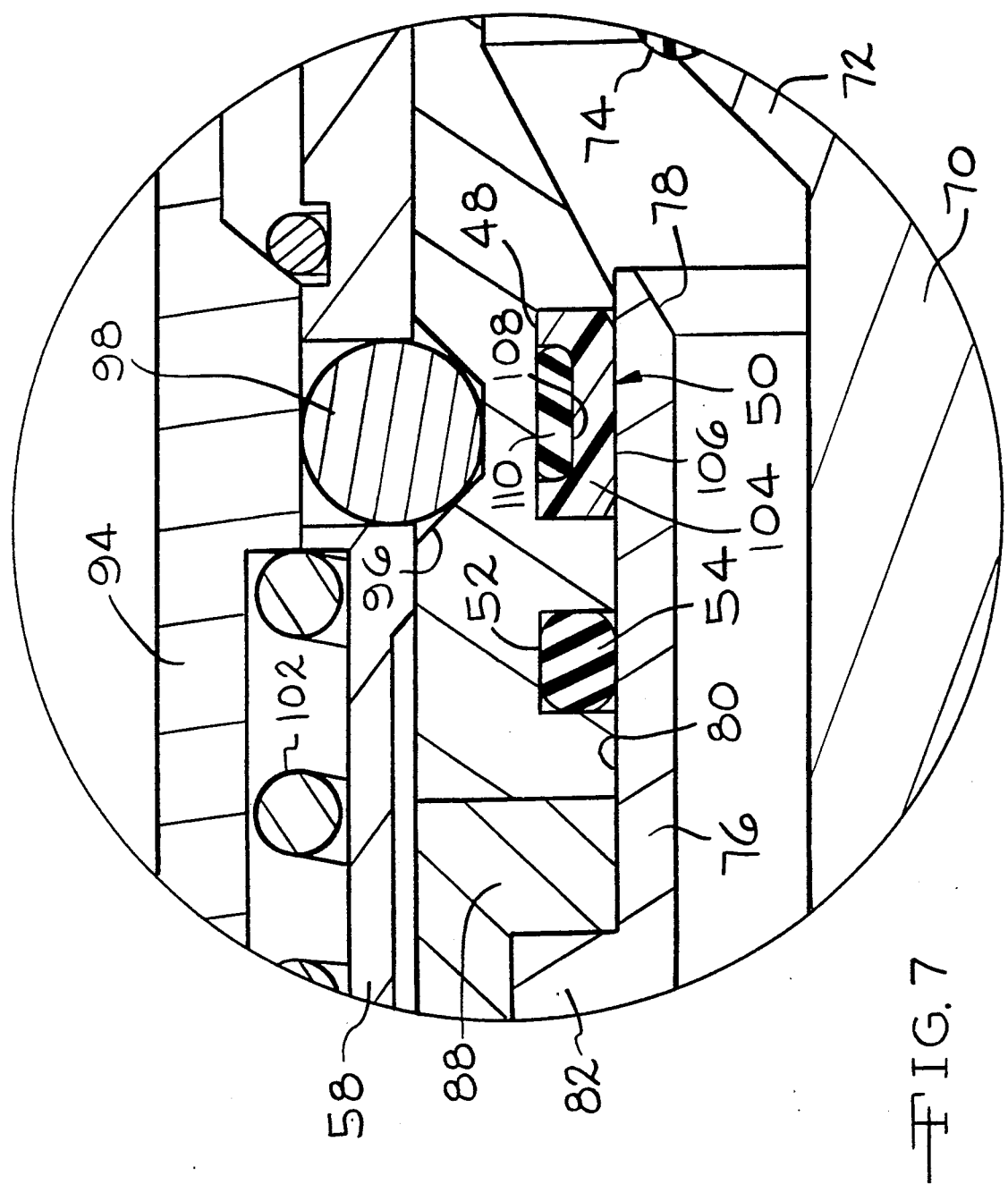
FIG. 7 is an enlarged detail view of the dual seal system of the invention of the portion indicated in FIG. 4.

The construction of the seal 50 is best appreciated from FIG. 7, and it will be noted that the rectangular recess 48 receives the seal body 104 in relatively close confinement. The body 104 is of a generally U-shaped configuration in a transverse cross-section and includes an internal diameter 106 adapted to have a sealing relationship with the poppet valve cylindrical surface 38 when the poppet valve is closed, and with the valve sleeve surface 80 when the coupling parts are fully interconnected as shown in FIG. 7.

An annular recess 108 is defined on the outer portion of the seal body 104 and a resilient O-ring 110 is located within the recess 108, and is under compression to serve to seal the body 104 with respect to the outer diameter of the recess 48.

The seal 50 is preferably constructed in the manner shown in assignee's U.S. Pat. No. 4,614,348, and the disclosure of this patent is herein incorporated. The seal body 104 is preferably formed of a stiff semi-rigid synthetic plastic material such as virgin polytetrafluoroethylene sold under the trademark Teflon by the Dupont Company. Other sealing materials than polytetrafluoroethylene may be used for the body 104 within the concepts of the invention, but it is necessary that the seal body 104 be sufficiently stiff and semi-rigid as to prevent being blown out of the recess 48 by the fluid pressures to which the seal 50 is exposed.

The O-ring type seal 54 located within the recess 52 may be of conventional elastomeric O-ring material such as formed of buna-N rubber or nitryl, but if desired, the O-ring seal 54 may be formed of polyurethane or other material having high resistance to cutting, and yet the seal 54 is soft enough and elastic enough to be capable of forming the desired fluid tight seal between the parts 12 and 14.

In use, the part 14 will be attached to the pressurized medium source fitting, not shown, by threads 24. The part 12 will be attached to the pressurized medium user, not shown, such as a tool, or the like, or, of course, may also be attached to a flexible hose supplying the tool.

To interconnect the parts 12 and 14 the outer ends 26 and 64 are aligned with the axes of the part passages coaxially related. The nose end 26 is of a radial dimension substantially equal to that of the detent sleeve head 88, and these parts will engage upon coaxial alignment of the parts 12 and 14 being achieved. As will be appreciated from FIGS. 2 and 3, the detent balls 98 ride upon the outer diameter of the detent sleeve 86, and the detent balls will be radially retracted so as not to interfere with the interconnection of the coupling parts.

As the parts 12 and 14 are axially moved toward each other the outer end 26 forces the sleeve 86 inwardly upon the valve sleeve 76, and the valve head 72 engages the outer end of the poppet valve 36, these engaging components being of substantially equal diameter.

At this time, while the sleeve 86 is moving inwardly on part 12, and the poppet valve 36 is moving inwardly within part 14, the valve sleeve end 78 remains in engagement with the valve seat 74, and the seal 50 remains in a sealed relationship relative to the poppet valve outer cylindrical surface 38. Accordingly, neither of the coupling parts valves have opened, and no fluid flow through the coupling parts exists.

Figure 3:
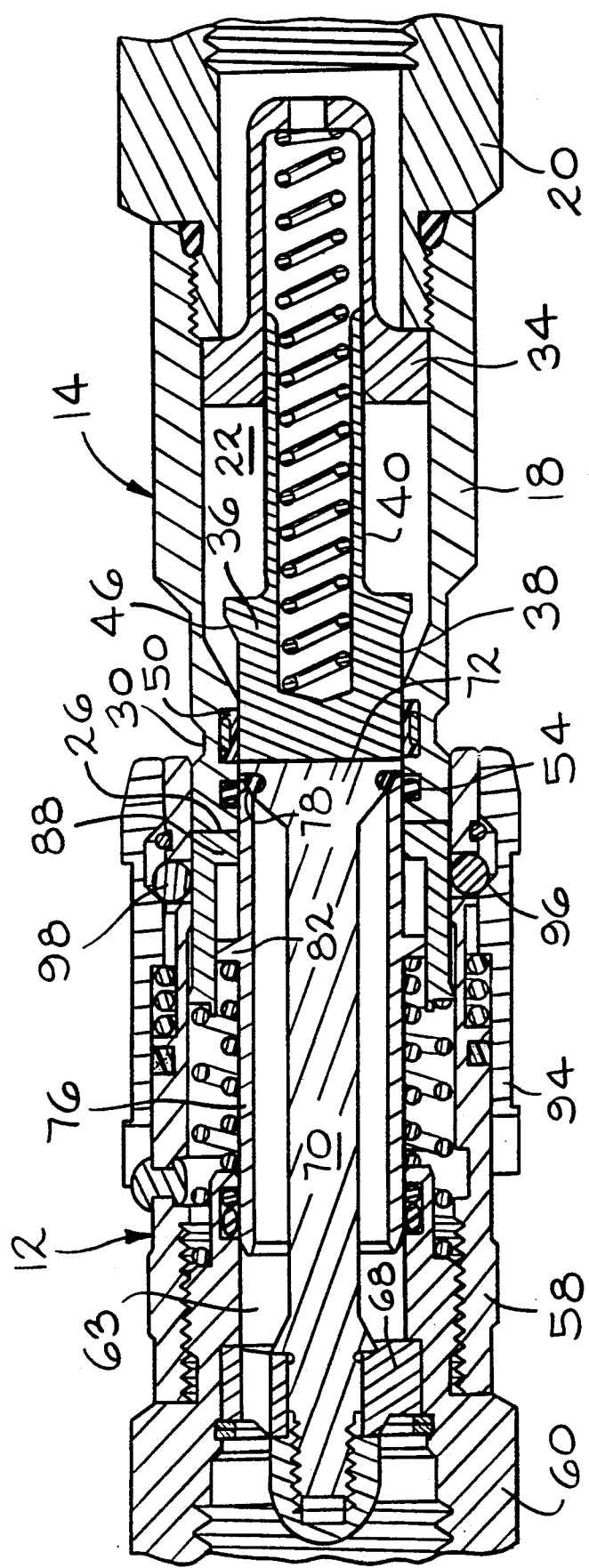
FIG. 3 is an elevational, diametrical, sectional view of the coupling parts as partially interconnected and prior to opening of the valves.

The axial spacing between the recesses 48 and 52 is such that during partial connection as shown in FIG. 3 the O-ring seal 54 will be located upon the valve sleeve sealing surface 80, and internally supported thereby, while the seal 50 is still in a sealed relationship to the poppet valve 36. As the maximum pressures that normally exist in the system will be within the passage 22 of part 14 the seal 50 acts as a buffer and protects the seal 54 from such high pressures as may exist within passage 22 and the presence of the seal 50 prevents such fluid pressures, and pressurized volumes as might cause the seal 54 to be flushed from its recess 52, from occurring as the seal 54 passes over the joint line between the valve head 72 and the end of the poppet valve 36.

Further axial displacement of the parts 12 and 14 toward each other causes the seal 50 to be received upon the valve sleeve surface 80, and continued movement of the parts causes the detent sleeve head 88 to engage the valve sleeve abutment shoulder 82 and axial displacement of the valve sleeve 76 to the left, FIG. 3, occurs. This valve sleeve movement opens the passage 62 due to the separation of the valve sleeve end 78 and the valve seat 74.

Simultaneously, the poppet valve surface 38 has cleared the sealing surface 32 and fluid may flow through the passage 22 of part 14.

Continued axial movement of the parts 12 and 14 toward each other continues until the groove 30 aligns with the detent balls 98 and the cam surface 96 will force the detents 98 into the groove 30 positioning the lock collar 94 as shown in FIG. 4. Interconnection of the coupling parts is now completed.

During connection and fluid flow through the coupling 10 the seal 50 continues to act as a buffer to protect the seal 54 and any fluid flowing or seeping past the seal 50 is only of low volume so as not to force the seal 54 from its recess 52.

To disconnect the coupling parts 12 and 14 the aforedescribed procedure is reversed. Shifting of the lock collar 94 to the left, FIG. 4, permits the ball detents 98 to be forced outwardly by the beveled edges of the groove 30, and the internal pressure within the parts 12 and 14 will rapidly force the parts apart. During disconnection, the axial spacing between the seals 50 and 54 is such, as described above, whereby the relationship shown in FIG. 3 will instantaneously exist and the seal 50 will continue to buffer and protect the O-ring seal 54 as the parts separate and the seals 50 and 54 are again located upon the poppet valve surface 38 as shown in FIG. 1.

The dual seal system of the invention as described above solves a perplexing problem for the HTMA coupling. The seal between the coupling parts must be resilient enough to provide reliable sealing over a broad pressure range, and yet, the seal must be stiff and rigid enough to resist blow-out or cutting when the parts are connected under pressure. In the sealing art, resiliency and elasticity, and stiffness and rigidity are conflicting requirements. In the practice of the invention the use of the axially spaced stiff and semi-rigid seal 50 as used in conjunction with the resilient O-ring seal 54 solves the dilemma, and the seal 50 protects the seal 54 under those situations which, previously, would have blown out, flushed out or extruded an O-ring seal. Additionally, the O-ring seal 54 acts as a separate interface seal for sealing the parts 12 and 14 relative to each other well before the self-closing valves of either part are open. The invention permits a redundancy to be achieved which provides a sealing efficiency for an HTMA coupling heretofore unachieved.

It is appreciated that various modifications to the inventive concepts may be apparent to those skilled in the art without departing from the spirit and scope of the invention.

We claim:

1. A dual seal system for fluid couplings consisting of first and second interconnectable parts wherein each of the parts includes a coupling connection end, an axial passage and at least one of the parts includes a self-sealing valve within its passage adapted to open upon interconnection of the parts, first sealing means defined upon the first part sealingly cooperating with a sealing surface defined on the second part upon interconnection of the parts, the improvement comprising the first sealing means defined in the first part passage comprising a first annular recess defined in the first part passage axially spaced from the first part connection end concentric to and intersecting the first part passage, a second annular recess defined in the first part passage between said first recess and said first part connection end spaced from and separate from said first recess and concentric to and intersecting the first part passage, a first annular seal ring located within said first recess adapted to engage the second part sealing surface when the parts are interconnected, a second annular seal ring located within said second recess adapted to engage the second part sealing surface when the parts are interconnected, said first seal ring including a stiff semi-rigid material to resist inadvertent displacement from said first recess by pressurized medium flow through the first part passage, said second seal ring being formed of a flexible elastomeric material of greater flexibility and resiliency than said first ring semi-rigid material to provide superior fluid sealing characteristics, said first seal ring protecting said second seal ring from exposure to high pressurized fluid flow during connection and disconnection of the first and second parts.

2. In a dual seal system for fluid couplings as in claim 1, said first seal ring including an inner ring of semi-rigid synthetic material and an outer ring circumscribing said inner ring of flexible elastomeric material.

3. In a dual seal system for fluid couplings as in claim 2, said outer ring comprising an O-ring.

4. In a dual seal system for fluid couplings as in claim 3, said inner ring being formed of polytetrafluoroethylene.

5. In a dual seal system for fluid couplings as in claim 1, said second seal ring comprising an O-ring.

6. A dual seal system for fluid couplings consisting of first and second interconnectable parts wherein the first part includes an elongated body having an axial passage intersecting an inner conduit connection end and an outer second part connection end, the passage adjacent the first part outer end comprising an axially extending poppet valve receiving surface, a poppet valve mounted within the body passage axially displaceable therein between open and closed positions and having a sealing surface received within the valve receiving surface at the valve closed position and removed from the valve receiving surface at the open position, the improvement comprising, a first annular recess defined in the first part body axially spaced from the first part outer end concentric to and intersecting the poppet valve receiving surface, a second annular recess defined in the first part body axially located between said first recess and the first part outer end separate from said first recess and concentric to and intersecting the poppet valve receiving surface, a first annular seal ring located within said first recess adapted to sealingly engage the poppet valve sealing surface when the poppet valve is in the closed position, a second annular seal ring located within said second recess adapted to sealingly engage the poppet valve sealing surface when the poppet valve is in the closed position, said first seal ring including a stiff semi-rigid material to resist inadvertent displacement from said first recess by pressurized medium flow through the first part passage, said second seal ring being formed of a flexible elastomeric material of greater flexibility and resiliency than said first ring semi-rigid material to provide superior fluid sealing characteristics, said first seal ring protecting said second seal ring from exposure to high pressurized fluid flow during connection and disconnection of the first and second parts.

7. In a dual seal system for fluid couplings as in claim 6, said first seal ring including an inner ring of semi-rigid synthetic material and an outer ring circumscribing said inner ring of flexible elastomeric material.

8. In a dual seal system for fluid couplings as in claim 6, said outer ring comprising an O-ring.

9. In a dual seal system for fluid couplings as in claim 6, said inner ring being formed of polytetrafluoroethylene.

10. In a dual seal system for fluid couplings as in claim 6, said second seal ring comprising an O-ring.

11. A dual seal system for fluid couplings consisting of male and female interconnectable parts wherein each of the parts includes an axial passage intersecting an inner conduit connection end and an outer coupling interconnection end, the male part including a poppet valve axially displaceable within the associated passage between open and closed positions, an annular axially extending cylindrical poppet valve sealing surface defined within the male part passage adjacent the male part outer end receiving a portion of the poppet valve at the closed position thereof, a spring biasing the poppet valve toward the closed position, a valve head concentrically located within and fixed relative to the female part passage at the female part outer end, an annular valve seat defined on the valve head, a valve sleeve mounted within the female part passage selectively axially displaceable between a closed position engaging the valve seat and an open position removed from the valve seat, a cylindrical outer sealing surface defined on the valve sleeve, a spring biasing the valve sleeve toward the closed position, a detent sleeve axially displaceable within the female part passage circumscribing the valve sleeve sealing surface and including an abutment selectively engaging the valve sleeve whereby predetermined axial displacement of the detent sleeve away from the female part outer end displaces the valve sleeve from the closed position to the open position, the detent sleeve having a head positionable adjacent the female part outer end and engageable by the male part outer end during interconnection of the parts, a spring biasing the detent sleeve toward the female part outer end, the diameter of the portion of the poppet valve received within the poppet valve sealing surface, the poppet valve sealing surface and the valve sleeve outer sealing surface being substantially equal whereby upon interconnection of the male and female parts the male part engages the detent sleeve, and the poppet valve sealing surface receives the valve sleeve outer sealing surface, the valve head displaces the poppet valve from the poppet valve sealing surface and the detent sleeve displaces the valve sleeve from the valve head seat, the improvement comprising a first annular recess concentrically defined in the poppet valve sealing surface axially spaced from the male part outer end, a second annular recess concentrically defined in the poppet valve sealing surface between said first recess and the male part outer end, a first annular seal ring located within said first recess adapted to sealingly engage the poppet valve when in the closed position and sealingly engage the valve sleeve sealing surface when the parts are fully interconnected, a second annular seal ring located with said second recess adapted to sealingly engage the poppet valve when in the closed position and sealingly engage the valve sleeve sealing surface when the parts are fully interconnected, said first seal ring including a stiff semi-rigid material to resist inadvertent displacement from said first recess by pressurized medium within the coupling parts, said second seal ring being formed of a flexible elastomeric material of greater flexibility and resiliency than said first ring semi-rigid material to provide superior fluid sealing characteristics, said first seal ring protecting said second seal ring from exposure to high pressurized fluid flow during connection and disconnection of the coupling parts, said first and second recesses being axially spaced sufficiently to permit seating of said second seal ring upon the valve sleeve sealing surface while said first seal ring is engaging the poppet valve and before the valve sleeve disengages the valve seat.

12. In a dual seal system for fluid couplings as in claim 11, said first seal ring including an inner ring of semi-rigid synthetic material and an outer ring circumscribing said inner ring of flexible elastomeric material.

13. In a dual seal system for fluid couplings as in claim 12, said outer ring comprising an O-ring.

14. In a dual seal system for fluid couplings as in claim 12, said inner ring being formed of polytetrafluoroethylene.

15. In a dual seal system for fluid couplings as in claim 11, said second seal ring comprising an O-ring.

* * * * *